United States Patent
Xu et al.

(10) Patent No.: US 11,571,676 B2
(45) Date of Patent: Feb. 7, 2023

(54) OPENING-CLOSING TYPE MICROWAVE CATALYTIC REACTION APPARATUS

(71) Applicant: KUNMING UNIVERSITY OF SCIENCE AND TECHNOLOGY, Kunming (CN)

(72) Inventors: Lei Xu, Kunming (CN); Libo Zhang, Kunming (CN); Hang Li, Kunming (CN); Zhaohui Han, Kunming (CN); Jianhua Liu, Kunming (CN); Junwen Zhou, Kunming (CN); Hongying Xia, Kunming (CN); Xiangxian Liu, Kunming (CN); Yi Xia, Kunming (CN); Xinpei Li, Kunming (CN)

(73) Assignee: KUNMING UNIVERSITY OF SCIENCE AND TECHNOLOGY, Kunming (CN)

( * ) Notice: Subject to any disclaimer, the term of this patent is extended or adjusted under 35 U.S.C. 154(b) by 0 days.

(21) Appl. No.: 17/492,140

(22) Filed: Oct. 1, 2021

(65) Prior Publication Data
US 2022/0314190 A1 Oct. 6, 2022

(51) Int. Cl.
*B01J 19/00* (2006.01)
*B01J 19/08* (2006.01)
*B01J 19/12* (2006.01)

(52) U.S. Cl.
CPC ......... *B01J 19/126* (2013.01); *B01J 19/0013* (2013.01); *B01J 19/0033* (2013.01);
(Continued)

(58) Field of Classification Search
CPC .... B01J 19/00; B01J 19/0006; B01J 19/0013; B01J 19/0033; B01J 19/08; B01J 19/12;
(Continued)

(56) References Cited

U.S. PATENT DOCUMENTS

| | | | |
|---|---|---|---|
| 2012/0177542 A1* | 7/2012 | Chang | H05H 1/46 422/186.04 |
| 2015/0004069 A1* | 1/2015 | Ishizuka | H05B 6/806 422/186 |

FOREIGN PATENT DOCUMENTS

| | | |
|---|---|---|
| CN | 204388154 U | 6/2015 |
| CN | 207831679 U | 9/2018 |

(Continued)

OTHER PUBLICATIONS

First Office Action dated May 5, 2022 corresponding to Chinese application No. 202110356773.3.
(Continued)

*Primary Examiner* — Natasha E Young
(74) *Attorney, Agent, or Firm* — Nath, Goldberg & Meyer; Joshua B. Goldberg

(57) ABSTRACT

The present disclosure provides an opening-closing type microwave catalytic reaction apparatus, including a microwave system, a microwave cavity, a protective cover, a cooling system, and a vertical furnace tube, where two ends of the furnace tube are respectively stretched out of the microwave cavity, the microwave system includes a plurality of microwave transmitting units, and the microwave transmitting unit includes a microwave transmitter; the furnace tube is provided with a gas inlet on a top and a gas outlet on a bottom; a compression hinge and a cavity cover capable of being opened or closed are arranged on the microwave cavity, a convex edge plate is disposed at an edge of the cavity cover, the compression hinge can compress the cavity cover such that the convex edge plate is tightly attached to a concave edge plate on the microwave cavity, and the protective cover can cover the entire cavity cover.

7 Claims, 10 Drawing Sheets

(52) U.S. Cl.
CPC ............... *B01J 2219/00058* (2013.01); *B01J 2219/00065* (2013.01); *B01J 2219/00085* (2013.01)

(58) Field of Classification Search
CPC .... B01J 19/122; B01J 19/126; B01J 2219/00; B01J 2219/00049; B01J 2219/00051; B01J 2219/00054; B01J 2219/00056; B01J 2219/00058; B01J 2219/00065; B01J 2219/000174; B01J 2219/00076; B01J 2219/00085
See application file for complete search history.

(56) References Cited

FOREIGN PATENT DOCUMENTS

| | | |
|---|---|---|
| CN | 109046185 A | 12/2018 |
| CN | 110819302 A | 2/2020 |

OTHER PUBLICATIONS

Notification to Grant Patent Right for Invention dated May 5, 2022 corresponding to Chinese application No. 202110356773.3.
Chinese Granted Text dated Jun. 7, 2022 for application No. 202110356773.3.

* cited by examiner

OPENING-CLOSING TYPE MICROWAVE CATALYTIC REACTION APPARATUS

This application claims priority of Chinese Patent Application No. CN202110356773.3, filed on Apr. 1, 2021.

TECHNICAL FIELD

The present disclosure relates to the technical field of petrochemical engineering, and in particular, to an opening-closing type microwave catalytic reaction apparatus.

BACKGROUND ART

Typically, only 10-40% of light oils such as gasoline, kerosene and diesel are attainable from the crude oil through atmospheric and vacuum distillation, with the rest being heavy distillate and residual oil. To obtain more light oils, the heavy distillate and residual oil must be processed for the second time. Catalytic cracking is a process in which heavy oil takes place a cracking reaction with a catalyst under a certain temperature and pressure and is converted into cracking gas, gasoline, diesel and so on. The gasoline, presents a high octane number (about 80 motor octanes in the motor method) and a good stability, and the cracking gas (refinery gas) contains much propylene, butene and isohydrocarbon. The catalytic cracking is the most common process for producing the gasoline and diesel, and also the most important link in production for ordinary petroleum refining enterprises.

Concerning the catalytic cracking of petroleum, a high-temperature environment is required. Since the conventional heating is the external heating, and it transfers heat to the surface of a heated material first by use of heat conduction, convection and radiation, then gradually rises the central temperature through the heat conduction, and makes a central part reach the desired temperature over a certain heat conduction time, the catalytic efficiency low; and moreover, the heating often generates pollutants, which is disadvantageous to environmental protection.

SUMMARY

An objective of the present disclosure is to provide an opening-closing type microwave catalytic reaction apparatus, to solve the problems in the prior art, and improve the catalytic cracking efficiency of the petroleum.

To achieve the above objective, the present disclosure provides the following solutions:

The present disclosure provides an opening-closing type microwave catalytic reaction apparatus, including a microwave system, a microwave cavity, a protective cover, a cooling system, and a vertical furnace tube, where the furnace tube passes through the microwave cavity, two ends of the furnace tube are respectively stretched out of the microwave cavity, the microwave system includes a plurality of microwave transmitting units that are layered up and down and can transmit a microwave to the microwave cavity, and the microwave transmitting unit includes a microwave transmitter; the furnace tube is provided with a gas inlet on a top and a gas outlet on a bottom; a compression hinge and a cavity cover capable of being opened and closed are arranged on the microwave cavity, a convex edge plate is disposed at an edge of the cavity cover, the compression hinge can compress the cavity cover such that the convex edge plate is tightly attached to a concave edge plate on the microwave cavity, the microwave system is disposed in an upper box body, the upper box body is fixedly disposed on a lower box body, the microwave cavity is partially located in the upper box body, the cavity cover is located out of the upper box body, and the protective cover can cover the entire cavity cover; the furnace tube is a quartz glass tube, a silicon carbide bead is disposed in the furnace tube, and a porous plate for supporting the silicon carbide bead is disposed on the bottom of the furnace tube; and the cooling system includes a water cooler, two first cooling sleeves that are respectively sleeved to the top and the bottom of the furnace tube, and a second cooling sleeve sleeved to the microwave transmitter, a water inlet of the first cooling sleeve and a water inlet of the second cooling sleeve respectively communicate with a water outlet of the water cooler, and a water outlet of the first cooling sleeve and a water outlet of the second cooling sleeve respectively communicate with a water inlet of the water cooler.

Preferably, the opening-closing type microwave catalytic reaction apparatus may further include a control module, where the control module includes a programmable logic controller (PLC) and a voltage stabilized power supply electrically connected to the PLC programmable controller, the microwave transmitting unit further includes a microwave power supply and a microwave power meter that are respectively and electrically connected to the microwave transmitter, and the water cooler, the microwave power supply and the microwave power meter are respectively and electrically connected to the PLC programmable controller.

Preferably, the opening-closing type microwave catalytic reaction apparatus may further include a detection module, where the detection module includes an acousto-optic alarm, a temperature sensor, a pressure sensor, a microwave leakage detector disposed out of the microwave cavity and an overheat switch disposed on a magnetron of the microwave transmitter, the temperature sensor includes two thermocouples that are respectively arranged on the top and the bottom of the furnace tube and a plurality of infrared thermometers arranged on the microwave cavity, the pressure sensor is disposed in the furnace tube, and the acousto-optic alarm, the temperature sensor, the pressure sensor, the microwave leakage detector and the overheat switch are respectively and electrically connected to the PLC programmable controller; the acousto-optic alarm and the voltage stabilized power supply are respectively and electrically connected to the microwave leakage detector; and the PLC programmable controller can control on and off of the magnetron through the overheat switch.

Preferably, the opening-closing type microwave catalytic reaction apparatus may further include an interactive module, where the interactive module includes a touch display screen electrically connected to the PLC programmable controller.

Preferably, the opening-closing type microwave catalytic reaction apparatus may further include a network card electrically connected to the PLC programmable controller, where the PLC programmable controller can be in signal connection with a computer through the network card, and a data interface for inputting and outputting data is further disposed on the PLC programmable controller.

Preferably, the top and the bottom of the furnace tube may be respectively connected to a furnace cover through a flange, the furnace cover may be connected to the corresponding flange through a bolt, a nut of the bolt may be away from the furnace tube, a compression spring may be sleeved on the bolt, and the compression spring may include one end abutted against the nut and the other end abutted against the furnace cover; and the gas inlet and the gas outlet may respectively communicate with the inside of the furnace tube through a ferrule tube fitting, the ferrule tube fitting may pass through the corresponding furnace cover, and a pressure ring may be disposed between the furnace cover and the ferrule tube fitting.

Preferably, a crank arm may include one end fixedly connected to a top of an upper cover, and the other end fixedly connected to a top of the cavity cover.

Preferably, a heat insulating material may be filled between the furnace tube and the microwave cavity, the heat insulating material may be a special-shaped material sintered from polycrystalline mullite and having a pentahedral structure, and a flexible graphite ring for sealing the microwave may be clamped between the first cooling sleeve and the furnace tube.

The present disclosure achieves the following technical effects compared with the prior art.

The opening-closing type microwave catalytic reaction apparatus provided by the present disclosure improves the catalytic cracking efficiency of the petroleum. The opening-closing type microwave catalytic reaction apparatus provided by the present disclosure uses microwave heating for the catalytic cracking of the petroleum. The microwave heating is the internal heating, and the electromagnetic energy directly acts on molecules of a medium to be converted into heat energy, and heats the inside and outside of the medium at the same time through transmission, thereby achieving uniform heating within a short time. The microwave does not generate any pollutant, which is advantageous to environmental protection. In addition, high-frequency vibration of the microwave is beneficial to polarization and activation of the molecules, to reduce reaction activation energy and take the effect of catalyzing the reaction. The apparatus prevents the microwave hazard to human bodies: from the source. In case of any microwave leakage, it gives an alarm immediately, and automatically cuts off the power supply of the magnetron, to prevent continuous generation of the microwave. The opening-closing type microwave catalytic reaction apparatus provided by the present disclosure has a master control system controlled by the programmable PLC, and acquires the temperature value in real time. It controls the temperature with a position proportion integration differentiation (PID) algorithm in a closed loop and controls the microwave power with an incremental PID algorithm, thereby being more accurate in control. The opening-closing type microwave catalytic reaction apparatus provided by the present disclosure is provided with a power-on self-test unit and a PLC self-test program. In case of any abnormal condition, it gives the alarm and provides abnormal information, such that a worker knows the abnormal information at the first moment. As an intelligent control system, the opening-closing type microwave catalytic reaction apparatus provided by the present disclosure achieves energy conservation, little environmental pollution and low labor intensity, and basically realizes automatic and continuous production. Furthermore, it supports remote monitoring of personal computers (PCs) in intranets and internets, and remote fault diagnosis of experts, thereby greatly improving the production efficiency.

BRIEF DESCRIPTION OF THE DRAWINGS

To describe the technical solutions in the embodiments of the present disclosure or in the prior art more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

In the figures: 100. opening-closing type microwave catalytic reaction apparatus, 1. furnace tube, 2. microwave cavity, 3. microwave system, 4. protective cover, 5. voltage stabilized power supply, 6. main switch, 7. cooling system, 8. detection module, 9. interactive module, 10. control module, H. special-shaped material, 12. compression hinge, 13. gas inlet, 14. gas outlet, 15. compression spring, 16. crank arm, 17. first cooling sleeve, 18. ferrule tube fitting, 19. flange, 21. cavity cover, 22. lower cavity seat, 23. pressure ring, 24. flexible graphite ring, 25. concave edge plate, 26. convex edge plate, 31. microwave transmitter, 32. microwave power supply, 33. upper box body, 34. lower box body, 71. cold water pipe, 81. temperature sensor, 82, pressure sensor, 83. overheat switch, 84. microwave power meter, 85. microwave leakage detector, 101. PLC programmable controller, 102. acousto-optic alarm, 103. power-on self-test unit, 104. network card, 105. interface, 1.06. computer, 171. water inlet of first cooling sleeve, 172. water outlet of first cooling sleeve, 811. infrared thermometer, and 812. thermocouple.

DETAILED DESCRIPTION OF THE EMBODIMENTS

The technical solutions in the embodiments of the present invention will be clearly and completely described hereinafter with the accompanying drawings in the embodiments of the present invention. It is apparent that the described embodiments are only part of the embodiments of the present. invention, not all of the embodiments. All other embodiments obtained by a person of ordinary skill in the art based on the embodiments in the present disclosure without creative efforts should fall within the protection scope of the present disclosure.

An objective of the present disclosure is to provide an opening-closing type microwave catalytic reaction apparatus, to solve the problems in the prior art, and improve the catalytic cracking efficiency of the petroleum.

To make the foregoing objective, features, and advantages of the present disclosure clearer and more comprehensible, the present. disclosure will be further described in detail below with reference to the accompanying drawings and specific embodiments.

Figure 1:
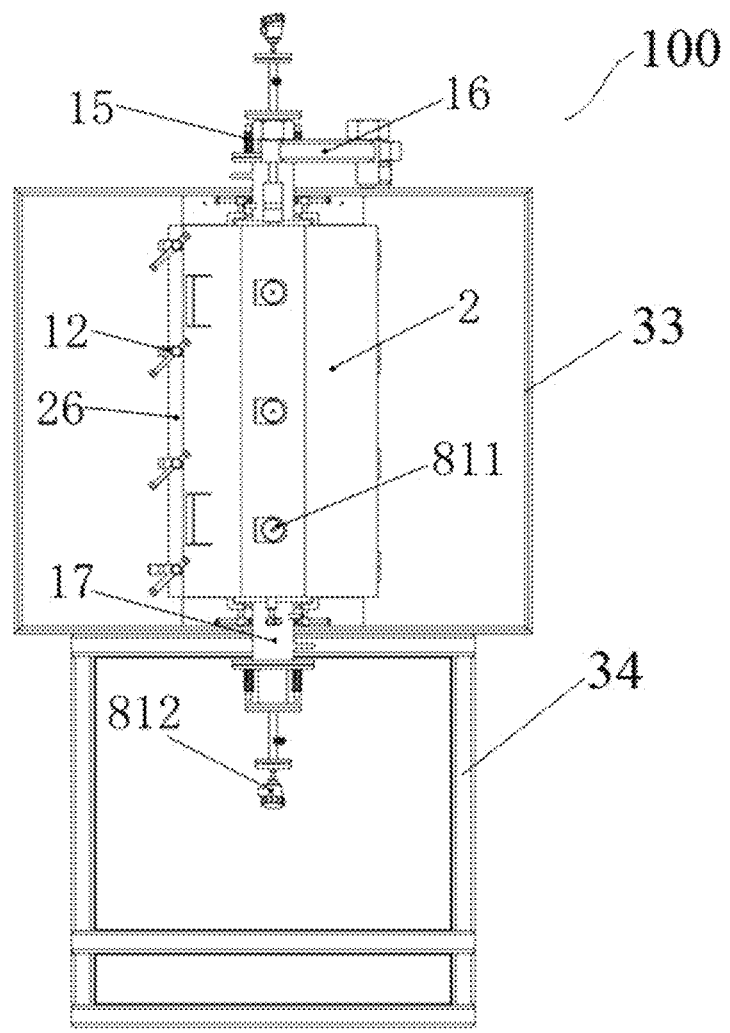
FIG. 1 is a first schematic structural view of an opening-closing type microwave catalytic reaction apparatus according to the present disclosure.
Figure 2:
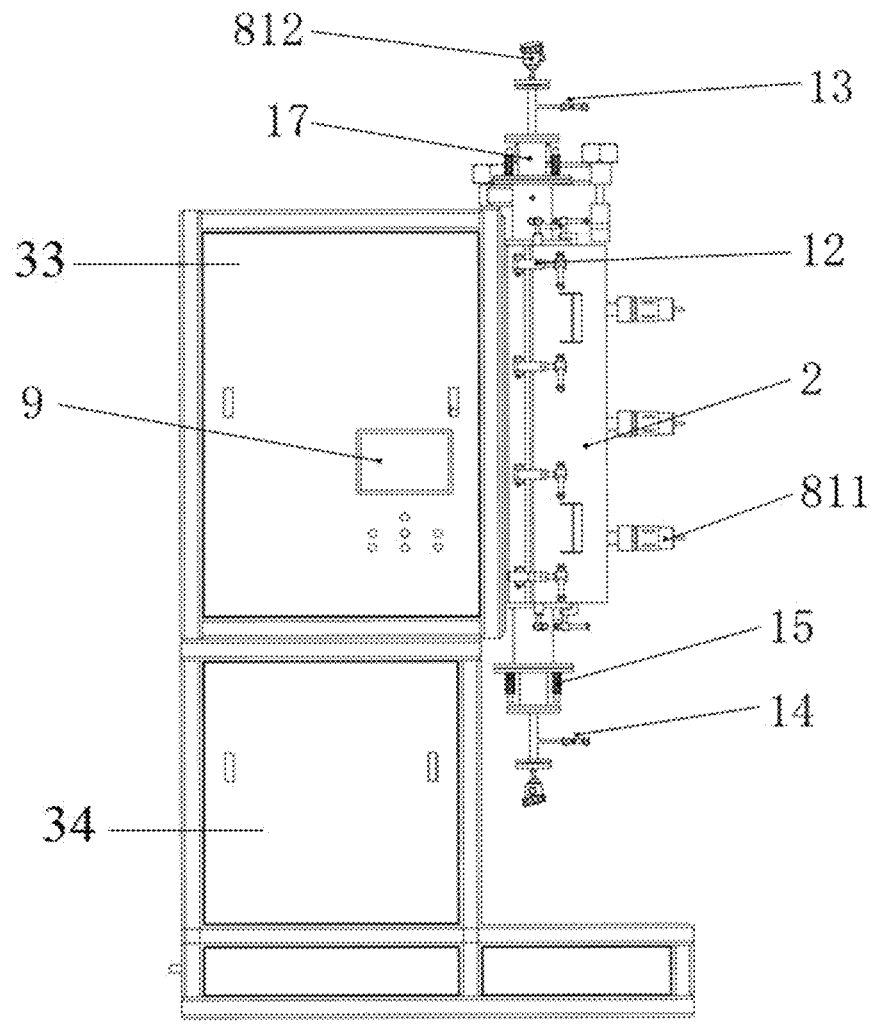
FIG. 2 is a second schematic structural view of an opening-closing type microwave catalytic reaction apparatus according to the present disclosure.
Figure 3:
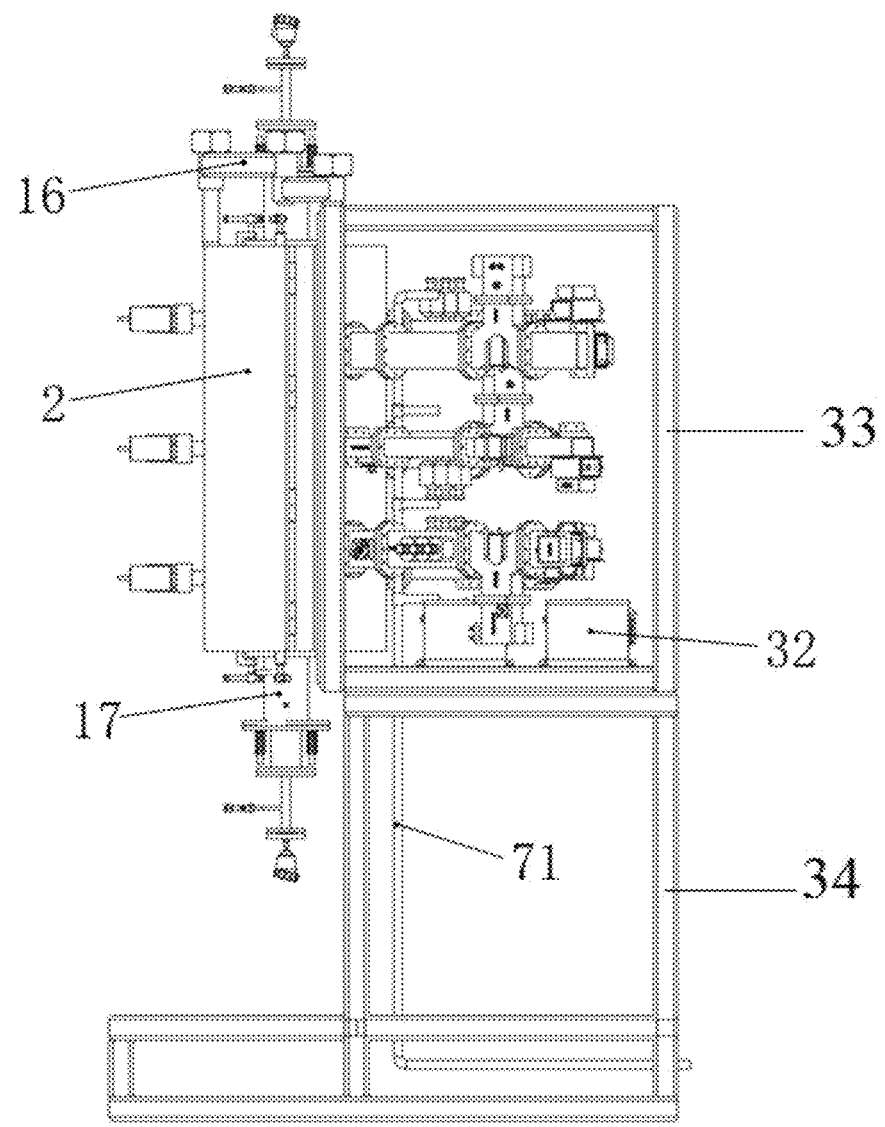
FIG. 3 is a third schematic structural view of an opening-closing type microwave catalytic reaction apparatus according to the present disclosure.
Figure 4:
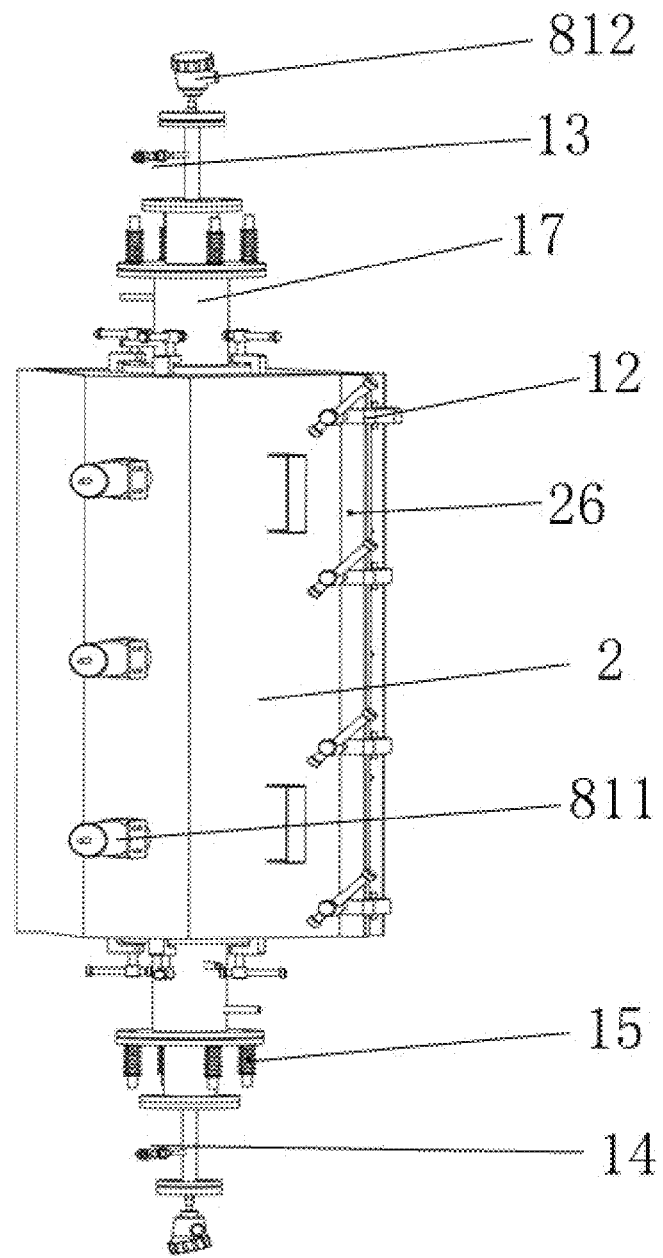
FIG. 4 is a first schematic partial structural view of an opening-closing type microwave catalytic reaction apparatus according to the present disclosure.
Figure 5:
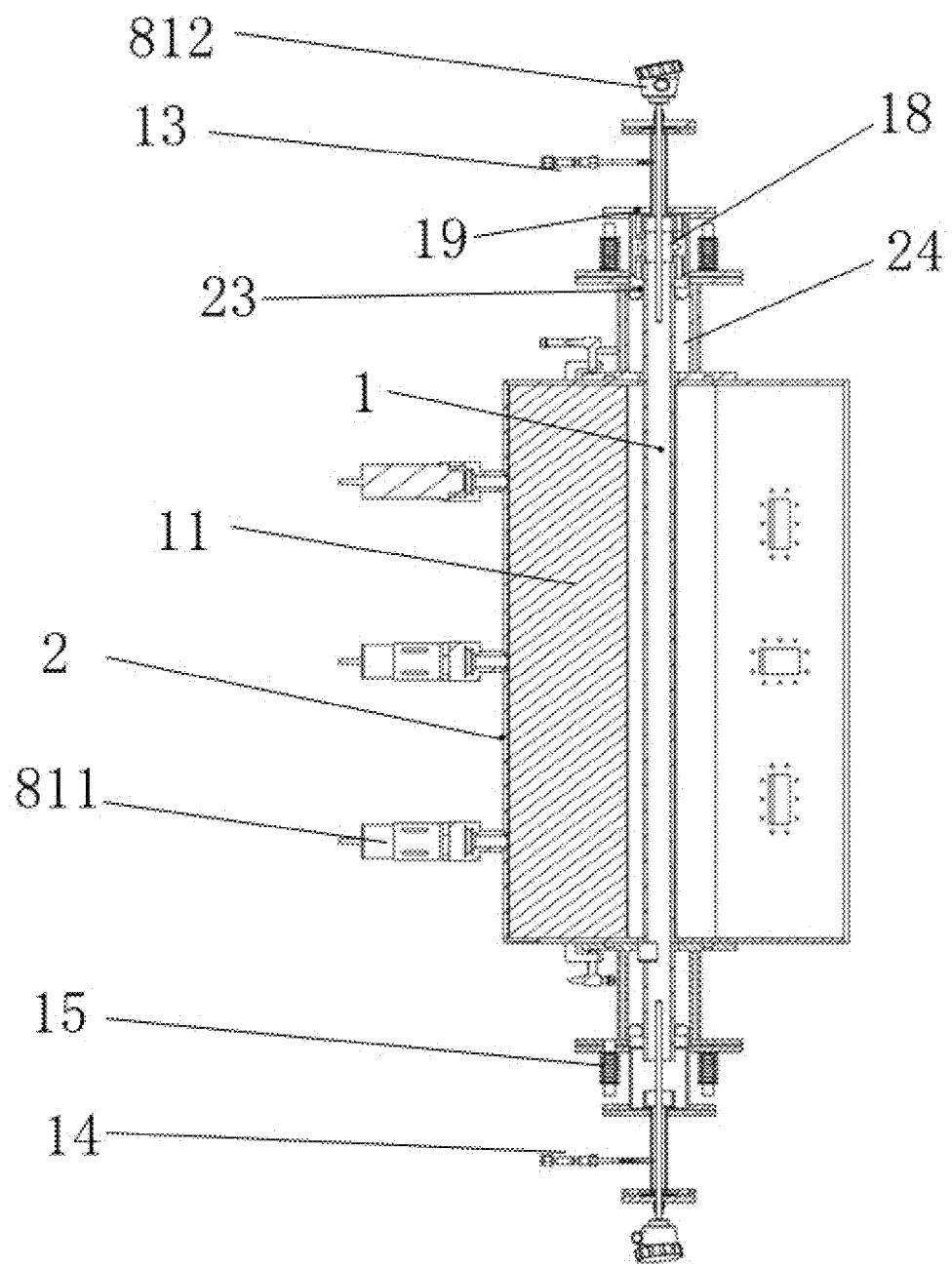
FIG. 5 is a second schematic partial structural view of an opening—closing type microwave catalytic reaction apparatus according to the present disclosure.
Figure 6:
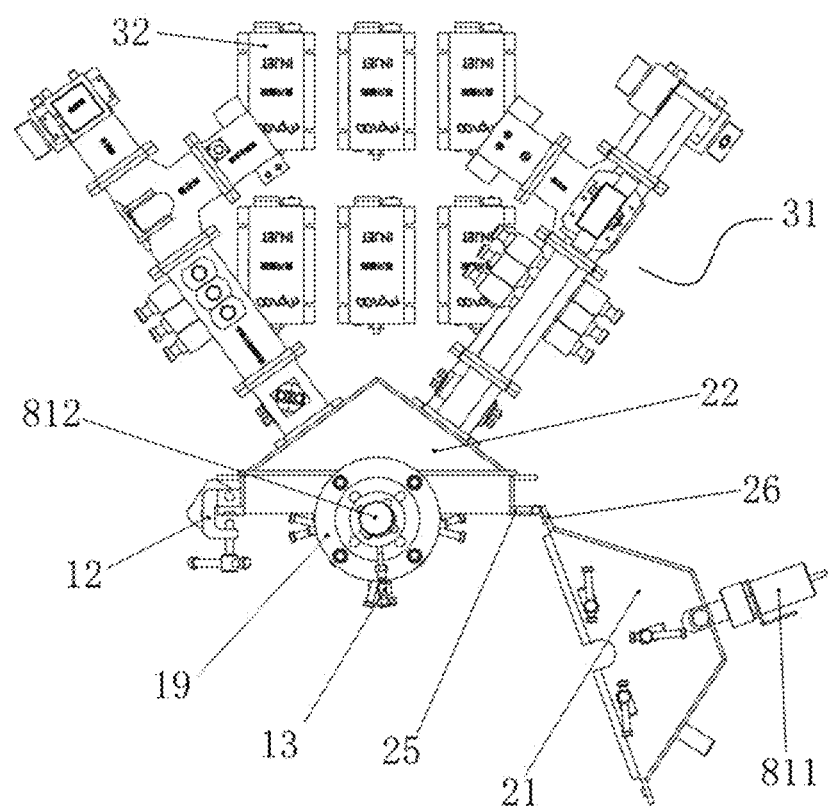
FIG. 6 is a fourth schematic structural view of an opening-closing type microwave catalytic reaction apparatus according to the present disclosure.
Figure 7:
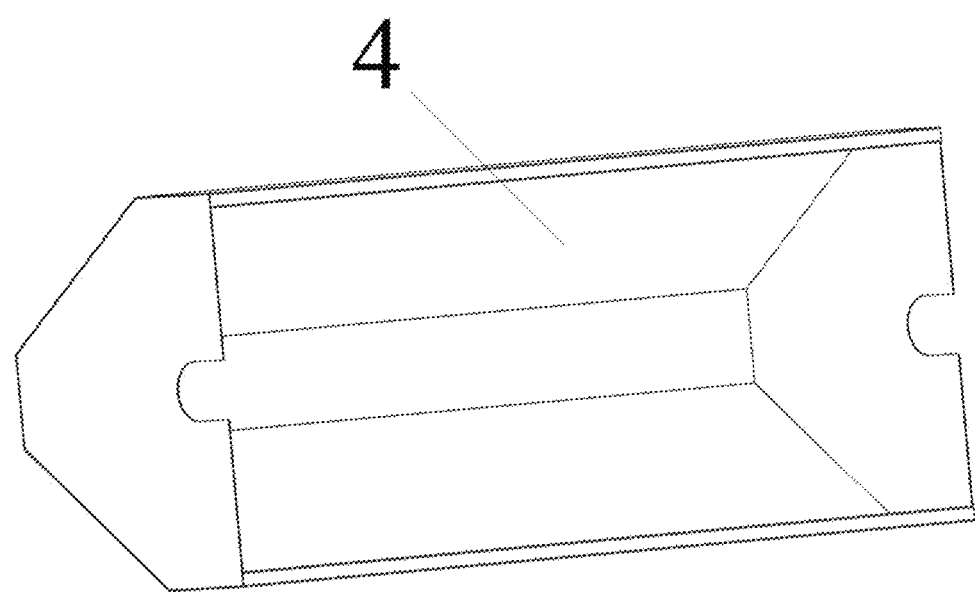
FIG. 7 is a schematic structural view of a protective cover in an opening-closing type microwave catalytic reaction apparatus according to the present disclosure.
Figure 8:
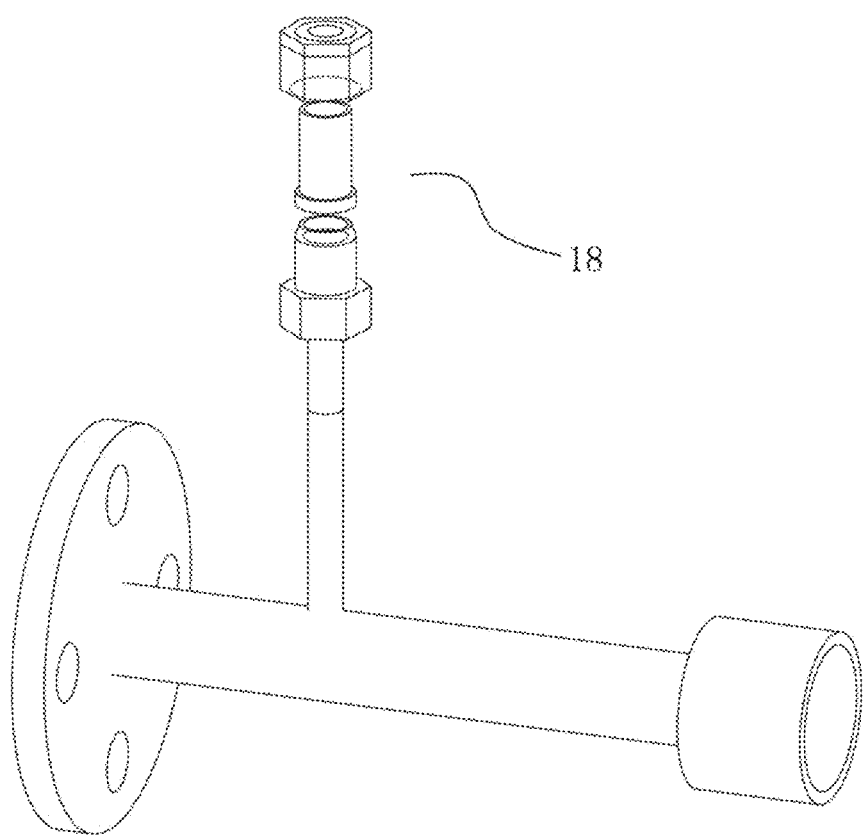
FIG. 8 is a schematic structural view of a ferrule tube fitting in an opening-closing type microwave catalytic reaction apparatus according to the present disclosure.
Figure 9:
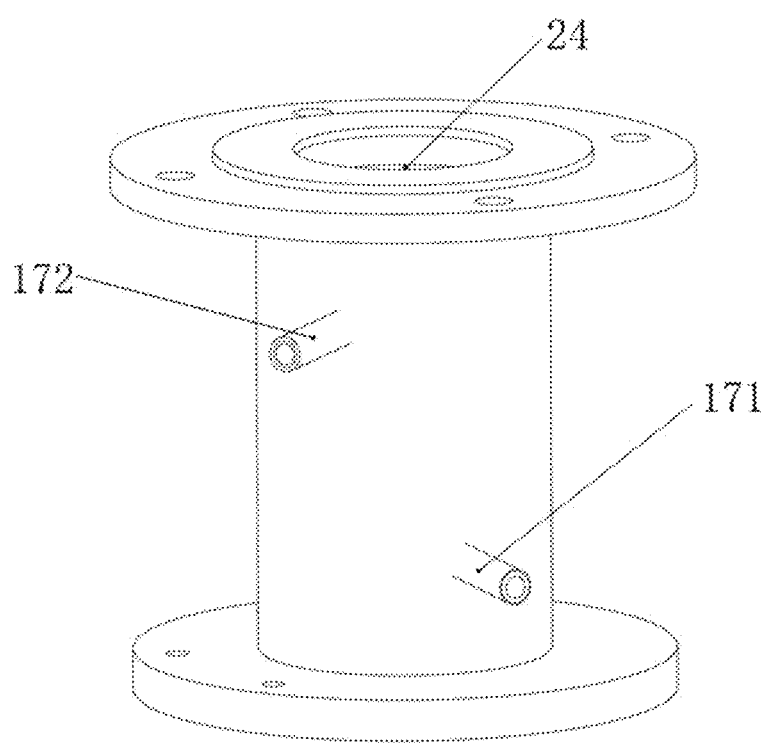
FIG. 9 is a schematic structural view of a first cooling sleeve in an opening-closing type microwave catalytic reaction apparatus according to the present disclosure.
Figure 10:
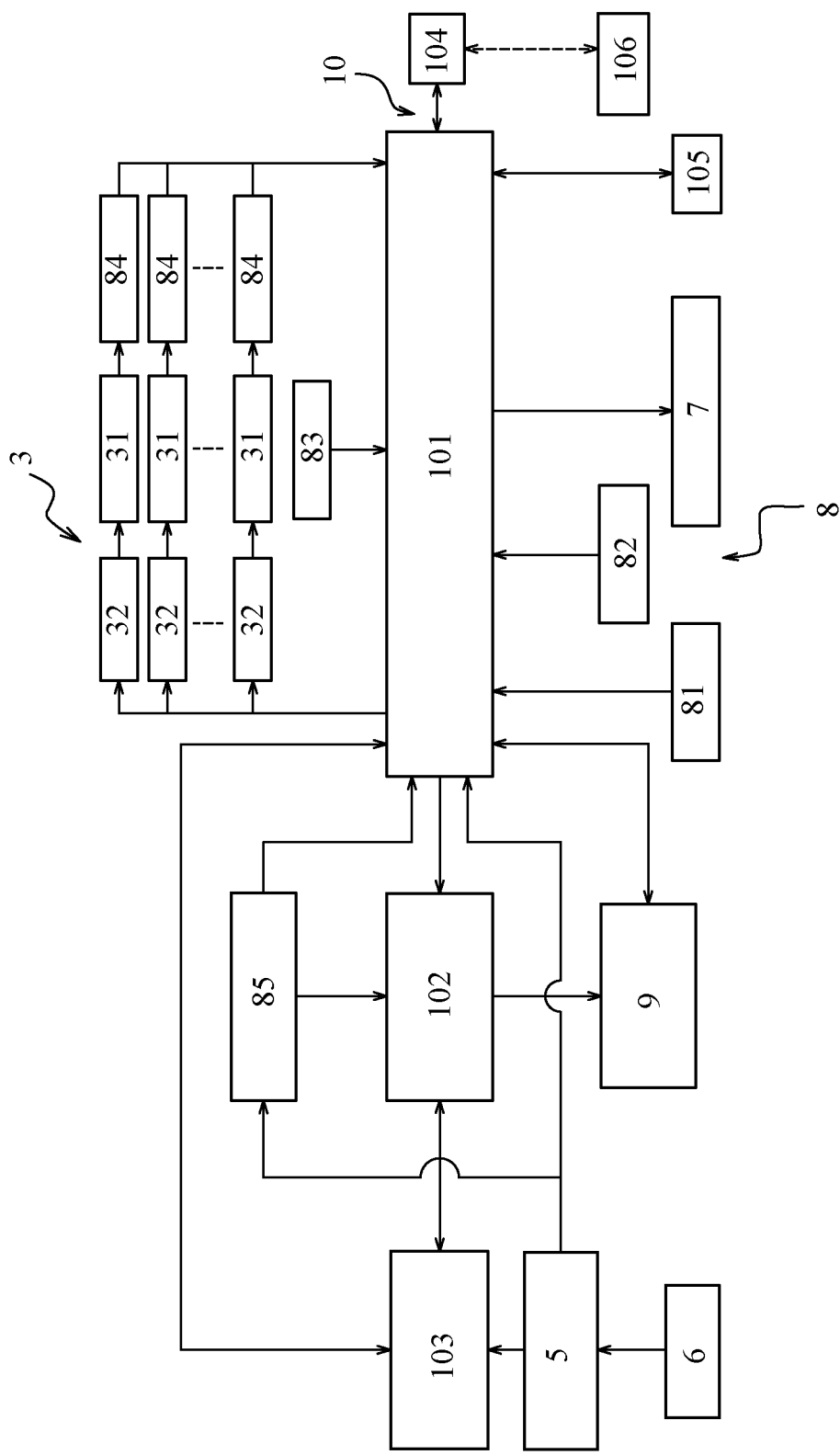
FIG. 10 is a control logic diagram of an opening-closing type microwave catalytic reaction apparatus according to the present disclosure.

As shown in FIG. 1 to FIG. 10, the embodiment provides an opening-closing type microwave catalytic reaction apparatus 100, including a microwave system 3, a microwave cavity 2, a protective cover 4, a control module 10, a detection module 8, an interactive module 9. a cooling system 7 and a vertical furnace tube 1, where the furnace tube 1 passes through the microwave cavity 2, and two ends of the furnace tube 1 are respectively stretched out of the microwave cavity 2.

The microwave system 3 includes six microwave transmitting units capable of transmitting a microwave to the microwave cavity 2. The six microwave transmitting units are arranged pairwise on three layers. The microwave transmitting unit includes a microwave power supply 32, a microwave transmitter 31 and a microwave power meter 84. The microwave power supply 32 and the microwave power meter 84 are respectively and electrically connected to the microwave transmitter 31. The microwave transmitter 31 is composed of a 1 KW magnetron, a waveguide, a circulator, a tuner, a water load and an orientor. The water load is mounted on the circulator, and configured to absorb the microwave and take isolation and protection effects. The power of each magnetron is automatically set or manually adjusted through the PLC programmable controller 101. The microwave power supply 32 has a working temperature of <88° C. When the working temperature is up to 88° C., protection against the overtemperature is provided, and the microwave power supply 32 module automatically shuts down. A baffle is covered on the microwave power supply 32, to prevent leakage of the cooling water into the microwave power supply 32 to damage the power supply.

A crank arm 16 includes one end fixedly connected to a top of the microwave cavity 2, and the other end fixedly connected to a cavity cover 21 on the microwave cavity 2. The crank arm 16 is configured to constrain a movement of the cavity cover 21, to prevent the opened cavity cover 21 from dropping down under the action of the own gravity. The crank arm 16 is intrinsically provided with two rotational joints, so the crank arm 21 can move along with the rotation of the cavity cover 21 when the cavity cover 21 is opened or closed. The microwave system 3 is disposed in an upper box body 33, the upper box body 33 is fixedly disposed on a lower box body 34, the control module 10 is disposed in the lower box body 34, the microwave cavity 2 is partially located in the upper box body 33, the cavity cover 21 is located out of the upper box body 33, and the protective cover 4 can cover the entire cavity cover 21. Same as the microwave cavity 2, the protective cover 4 also uses an opening-closing structure. The protective cover 4 is connected to the microwave cavity 2 through a hinge. The protective cover 4 may cover the entire cavity cover 21 after closed, thereby forming a layer of barrier outside the cavity cover 21 to prevent the microwave leakage. In this way, not only is the end cover on the upper end of the furnace tube 1 opened conveniently to fill a microwave absorbing substance, but the leaked microwave around the cavity is also obstructed. Therefore, the protective cover 4 is opened only before start or after stop of the apparatus. In a case where the microwave is switched on, the protective cover 4 is not opened. Both the summer and the winter are peak seasons to consume the electricity. Excessive electrical appliances will lead to a case where the actual voltage is lower than the rated voltage 380 V and the machine cannot be started normally to affect its work. The voltage stabilized power supply 5 mainly ensures that the machine can operate normally at the electricity consumption peaks.

The furnace tube 1 is provided with a gas inlet 13 on a top and a gas outlet 14 on a bottom; and the furnace tube 1 is a quartz glass tube, a silicon carbide bead is disposed in the furnace tube 1, and a porous plate for supporting the silicon carbide bead is disposed on the bottom of the furnace tube 1. As the quartz glass tube is wave-transparent, the microwave is reflected for a plurality of times in the microwave cavity 2 to repeatedly heat the material. The silicon carbide bead is wave-absorbing, so it may be heated first and then conducts the heat to the material. The material may be heated with the above two heating manners. The furnace tube 1 has an effective length of 800-1200 mm Upper and lower end covers of the furnace tube 1 are fixed by a bolt, which offers the convenience of filling the wave-absorbing substance in the furnace tube 1, and further stretching the thermocouple 812 and the pressure sensor 82 into the furnace tube 1 for parameter measurement. In addition, the top and the bottom of the furnace tube 1 are respectively connected to a furnace cover through a flange 19, the furnace cover is connected to the corresponding flange 19 through the bolt, a nut of the bolt is away from the furnace tube 1, a compression spring 15 is sleeved on the bolt, and the compression spring 15 includes one end abutted against the nut and the other end abutted against the furnace cover, all of which may prevent the damage of the furnace tube 1 due to the excessive pressure of the bolt. Moreover, the compression spring 15 may automatically adjust the expansion of the furnace tube 1. Before the material is charged, the opening-closing type microwave catalytic reaction apparatus 100 provided by the embodiment heats the material to 300-400° C. first through a material preheating apparatus, and then sends the material to the furnace tube 1 for a reaction, thereby maintaining the temperature of the furnace tube 1, shortening the reaction time and improving the working efficiency. The PLC programmable controller 101 starts a water cooler after the device is powered on and initialized. The resistor serves as a heat source of the material preheating box, and the PLC programmable controller 101 controls the preheating temperature of the material with a PID algorithm in a closed loop.

The gas inlet 13 and the gas outlet 14 respectively communicate with the inside of the furnace tube 1 through a ferrule tube fitting 18, the ferrule tube fitting 18 passes through the corresponding furnace cover, and a pressure ring 23 is disposed between the furnace cover and the ferrule tube fitting, that is, the furnace tube 1 is sealed by the pressure ring 23 and the ferrule tube fitting 18, and the gas inlet and outlet 14 are connected in a ferrule flaring manner, thereby making the connection firmer. The material (gas) is heated under a micropressure (<0.3 MPa) to prevent escape of the gas. The material is heated to 800-1200° C. for cracking. The ferrule tube fitting seals the inlet and outlet gas in cooperation with the pressure ring 23, to prevent ingress of air to the furnace to cause accidents.

The microwave cavity 2 is of a pentahedral structure. The microwave cavity 2 is made of SUS304 stainless steel, with a frame being divided into upper and lower pails made of Q235 through paint spraying. The structure is provided with the opening-closing type microwave cavity 2 on the front upper side, and a gas outlet operating region on the front lower side. The device is respectively provided with two double doors on back upper and lower sides, a display screen door on the left upper side, and a detachable door on the left lower side as well as the right upper and lower sides. These doors form a multi-faceted maintenance access. A heat insulating material is filled between the furnace tube 1 and the microwave cavity 2. The heat insulating material is a special-shaped material 11 sintered from polycrystalline mullite and having a pentahedral structure, and has a desired heat insulating effect. The microwave cavity 2 is of the opening-closing type structure, a compression hinge 12 and a cavity cover 21 capable of being opened and closed are arranged on the microwave cavity 2, a convex edge plate 26 is disposed at an edge of the cavity cover 21, and a concave edge plate 25 is disposed on a lower cavity seat 22 and corresponding to the convex edge plate 26. The compression hinge 12 can compress the cavity cover 21 such that the convex edge plate 26 is tightly attached to the concave edge plate 25 on the lower cavity seat 22. The opening is sealed by the concave edge plate 25 and the convex edge plate 26, to prevent the microwave leakage herein. A flexible graphite ring 24 for sealing the microwave is clamped between the first cooling sleeve 17 and the furnace tube 1. The flexible graphite ring 24 can absorb the microwave on two ends of the furnace tube 1 to prevent the microwave leakage.

The cooling system 7 includes a water cooler, two first cooling sleeves 17 that are respectively sleeved to the top and the bottom of the furnace tube 1, and a second cooling sleeve sleeved to the microwave transmitter 31; a cold water cavity and a water inlet and a water outlet that respectively communicate with the cold water cavity are arranged in the first cooling sleeve 17 and the second cooling sleeve; the water inlet 171 of the first cooling sleeve and the water inlet of the second cooling sleeve respectively communicate with a water outlet end of a cold water pipe 71; a water inlet end of the cold water pipe 71 communicates with a water outlet of the water cooler; the water outlet 172 of the first cooling sleeve and the water outlet of the second cooling sleeve respectively communicate with a water inlet of the water cooler through a water return pipe; and the second cooling sleeve is specifically sleeved to the magnetron and communicates with the water pipe of the water cooler, to cool the magnetron, The water cooler in the embodiment uses an intelligent laser water cooler, and is configured to cool core components of the device. The cooling water respectively cools the magnetron of the microwave system 3 and the upper and lower furnace covers of the furnace tube 1, to prevent the damage of these components due to the overhigh temperature.

The opening-closing type microwave catalytic reaction apparatus 100 provided by the embodiment has the following technical process: The preheated gas passes through the gas inlet 13, the temperature control segment of the furnace tube 1, the catalyst temperature segment of the furnace tube 1, the continuous reaction segment of the furnace tube 1, and the cooling segment of the furnace tube 1, and enters the collection procedure from the gas outlet 14 on the lower end. Hence, the microwave transmitters 31 are arranged on three layers in two columns, to respectively transmit the microwave to upper, middle and lower parts of the furnace tube 1. The power of the single magnetron is continuously adjustable within 0.1-1.0 kW. The apparatus is provided with the aluminum waveguide, water cooling, overcurrent protection and overtemperature protection, and has the microwave frequency of 2450±50 MHz and the maximum microwave output power of 6 kw (6*1.0 kw). The PLC respectively controls the 6 microwave transmitters 31 on the three layers, such that the actual temperature on each layer of the furnace tube 1 reaches a set temperature; and the PLC programmable controller 101 controls a temperature difference between the middle layer and the lower layer of the furnace tube 1 within 5-10° C., to ensure the high reaction efficiency.

The detection module 8 includes an acousto-optic alarm 102, a temperature sensor 81, a pressure sensor 82, a microwave leakage detector 85 disposed out of the microwave cavity 2 and an overheat switch 83 disposed on the magnetron of the microwave transmitter 31, the temperature sensor 81 includes two thermocouples 812 that are respectively arranged on the top and the bottom of the furnace tube 1 and a plurality of infrared thermometers 811 arranged on the microwave cavity 2, the pressure sensor 82 is disposed in the furnace tube 1, and the acousto-optic alarm 102, the temperature sensor 81, the pressure sensor 82, the microwave leakage detector 85 and the overheat switch 83 are respectively and electrically connected to the PLC programmable controller 101; the acousto-optic alarm 102 and the voltage stabilized power supply 5 are respectively and electrically connected to the microwave leakage detector 85, the voltage stabilized power supply 5 is connected to a main switch 6, and the main switch 6 can control on and off the voltage stabilized power supply 5; and the PLC programmable controller 101 can control on and off of the magnetron through the overheat switch 83.

The detection module 8 is the basis for automatic control of the apparatus. The detection module 8 includes the temperature sensor 81, the overheat switch 83, the microwave power meter 84, the microwave leakage detector 85 and the pressure sensor 82. The temperature sensor 81 is configured to measure an actual temperature of each part of the furnace, and make the PLC programmable controller 101 accurately control a reaction temperature in cooperation with the microwave transmitter 31. In addition, the water cooler feeds the temperature of the cooling water back to the PLC programmable controller 101 for control, because overhigh temperature of the cooling water has a poor cooling effect for the core components of the device and will burn out the components. The pressure sensor 82 is configured to measure an internal pressure of the furnace tube 1, with the normal working pressure being 0.1 MPa <furnace tube 1≤0.3 MPa. The pressure sensor 82 monitors the pressure value in real time, and feeds it back to the PLC for control. Mounted on an outer surface of the magnetron, the overheat switch 83 detects whether the circulating cooling water normally cools the magnetron, and sends an on-off signal to the PLC programmable controller 101 to control start-stop of the microwave and display of the touch screen. The microwave leakage detector 85 is mounted outside the opening of the microwave cavity 2, and is mainly in charge of detecting the microwave around the cavity. When detecting that the microwave leakage is higher than the national standard 5 mW/cm$^2$, the microwave leakage detector 85 sends a microwave leakage signal to the acousto-optic alarm 102 and the PLC programmable controller 101; and the acousto-optic alarm 102 gives an alarm, the touch display screen displays the microwave leakage information, and the PLC programmable controller 101 cuts off the power supply of the magnetron, to prevent continuous microwave leakage and further remind the worker of overhauling. As one touch display screen (which is the Shanghai Kinco GL100E touch screen), the interactive module 9 is applied to various industrial environments because of the beautiful design, durability and convenience in operation. The touch display screen is mounted on a left side of the device, is configured to display a temperature value at each place, a microwave power value, a pressure value, a working state of the magnetron and a fault alarm, and may further be provided with temperature and microwave power parameters, and a switched manual/automatic mode, There are also the start, stop, reset and emergency stop buttons of the device on the touch display screen.

The control module 10 includes the PLC programmable controller 101 and the voltage stabilized power supply 5 electrically connected to the PLC programmable controller 101, the microwave transmitting unit further includes the microwave power supply 32 and the microwave power meter 84 that are respectively and electrically connected to the microwave transmitter 31, and the water cooler, the microwave power supply 32 and the microwave power meter 84 are respectively and electrically connected to the PLC programmable controller 101. The PLC programmable controller serves as a master control system. The PLC programmable controller is a digital operation controller provided with a microprocessor and configured for the automatic control, and may load a control instruction to a memory at any time for storage and execution. The PLC programmable controller 101 is composed of a central processing unit (CPU), an instruction and data memory, an input/output interface 105, a power supply, a digital-to-analog converter and other functional units. The PLC programmable controller 101 in the embodiment uses the Siemens S7-1200 PLC with a high cost performance, and features the stability, reliability, flexible programming, and convenience in expansion. The PLC programmable controller 101 is connected to the microwave system 3, the cooling module, the detection module 8, the interactive module 9 and the acousto-optic alarm 102. As an operation system of the device, it controls the start, stop, reset, emergency stop, power supply and manual/automatic mode switching of the machine. All parameters of the device are displayed and controlled by the PLC programmable controller 101 and the touch display screen. The PLC programmable controller 101 is further reserved with a data interface 105 to facilitate mutual control with related devices. The PLC programmable controller 101 further serves as a memory, and it acquires data generated by each module and stores the data in an internal memory or a mobile storage medium. The PLC programmable controller 101 is provided with a wired network card 104 for network connection, such that remote monitoring on the device operation in intranets and internets, remote reading of historical data and remote diagnosis of experts for the machine fault may be implemented through a computer 106, thereby greatly improving the production efficiency.

The power-on self-test unit 103 is a chip to which a basic input/output system (BIOS) program is burned. It tests all key components once after the device is powered on, which is similar to a case where the BIOS program cured in the read only memory (ROM) chip of the mainboard runs automatically first when the computer 106 is started. The self-test includes test on the CPU, system mainboard, basic 640 KB memory, extended memory beyond 1 MB, system ROM and BIOS, check on system configurations in the complementary metal oxide semiconductor (CMOS), test on the interface 105, examination on the keyboard, floppy drive, hard disk and compact disc ROM (CDROM). Any error found in the self-test will be handled as two cases. For the serious fault (catastrophic fault), the device shuts down; and at this time, there is no any prompt or signal as various initialization operations have not been completed yet. For the non-serious fault, a prompt or an acoustic alarm signal is given to wait for handling of the user. The power-on self-test unit 103 sends an abnormal signal to the acousto-optic alarm 102 and the PLC programmable controller 101 in case of any abnormal condition; the acousto-optic alarm 102 reminds the worker of an alarm, and sends an abnormal code to the interactive module 9; upon the analysis of the interactive module 9, the touch display screen turns red and displays the fault code; and the PLC programmable controller 101 prevents the machine from starting upon the reception of the abnormal signal, and the start button on the touch display screen is in temporary failure. After the abnormal condition is repaired, the power-on self-test unit 103 sends a restoration signal to the acousto-optic alarm 102 and the PLC programmable controller 101, the acousto-optic alarm 102 stops warning and sends a restoration code to the interactive module 9, the PLC programmable controller 101 waits for a machine start signal, and the touch display screen turns green to restore the function of the start button, After the machine starts, the system self-test is conducted by the PLC programmable controller 101. The PLC programmable controller 101 sends a self-test signal to the connected modules and units at intervals to check whether each component is normal, thereby ensuring the safe operation of the system.

Every cycle time T1, the PLC programmable controller 101 acquires actual temperature. values measured by the temperature sensor 81 for the upper, middle and lower parts of the furnace tube 11, and compares each actual temperature value with a manually set target temperature value. When the two temperature values are unequal, the PLC programmable controller 101 in the manual mode samples the microwave power meter 84 of the detection module 8 every cycle time T1, performs processing, and calculates control parameters with an incremental PID algorithm to act on the microwave power supply 32 of the microwave system 3, in an attempt to control the microwave power by changing an anode current of the magnetron; and the PLC programmable controller 101 in the automatic mode controls the microwave power supply 32 in an open loop according to a positive or negative difference value between the actual temperature and the target temperature. Every cycle time T2, the PLC programmable controller 101 acquires an internal pressure value. measured by the pressure sensor 82 for the vertical heating furnace tube 1. When the actual pressure value is more than or less than the safe working pressure, the PLC programmable controller 101 stops the machine and feeds a high voltage or under-voltage signal back to the interactive module 9 and the acousto-optic alarm 102; and the acousto-optic alarm 102 gives an alarm, and the touch display displays high voltage or under-voltage information to remind the worker of overhauling.

The opening-closing type microwave catalytic reaction apparatus 100 provided by the embodiment makes electrons in substance molecules rotated or vibrated frequently by use of a high-frequency electric field generated by the microwave, heats the substance with heat generated by friction between the molecules, and directly heats the material by means of energy dissipation of the microwave in the material. The microwave catalysis is to heat and decompose the substance with a high temperature that is quickly generated by the material or its property of indirectly absorbing the microwave, heat the gas to 800-1200° C. with the wave absorption of the silicon carbide bead in the furnace tube 1, synthesize or crack the material (gas) by controlling the time difference, and ensure the process requirements by adjusting the flow and time.

In the description of the present disclosure, it should be noted that orientation or position relationships indicated by terms "top", "bottom", "left", "right", "vertical", "horizontal", "inner", "outer", etc. are orientation or position relationships as shown in the drawings, for ease of the description of the present application and simplifying the description only, rather than indicating or implying that the indicated apparatus or element must have a particular orientation or be constructed and operated in a particular orientation. Therefore, these terms should not be understood as a limitation to the present disclosure. in addition, the terms "first" and "second" are used for descriptive purposes only and cannot be construed as indicating or implying a relative importance.

Specific embodiments are used in this specification for illustration of the principles and implementations of the present disclosure. The description of the embodiments is merely used to help understand the method and its core principles of the present disclosure. In addition, a person skilled in the art can make various modifications to the specific implementations and application scope in accordance with the teachings of the present disclosure. in conclusion, the content of this specification should not be construed as a limitation to the present disclosure.

What is claimed is:

1. An opening-closing type microwave catalytic reaction apparatus for catalytic cracking of petroleum comprising a microwave system, a microwave cavity, a protective cover, a cooling system, and a vertical furnace tube, wherein the furnace tube passes through the microwave cavity, two ends of the furnace tube are respectively stretched out of the microwave cavity, the microwave system comprises a plurality of microwave transmitting units that are layered up and down and transmit a microwave to the microwave cavity, and the microwave transmitting unit comprises a microwave transmitter; the furnace tube is provided with a gas inlet on a top and a gas outlet on a bottom; a compression hinge and a cavity cover capable of being opened or closed are arranged on the microwave cavity, a convex edge plate is disposed at an edge of the cavity cover, the compression hinge compresses the cavity cover such that the convex edge plate is tightly attached to a concave edge plate on the microwave cavity, the microwave system is disposed in an upper box body, the upper box body is fixedly disposed on a lower box body, the microwave cavity is partially located in the upper box body, the cavity cover is located out of the upper box body, and the protective cover covers the entire cavity cover; the furnace tube is a quartz glass tube, a silicon carbide bead is disposed in the furnace tube, and a porous plate for supporting the silicon carbide bead is disposed on the bottom of the furnace tube; and the cooling system comprises a water cooler, two first cooling sleeves that are respectively sleeved to the top and the bottom of the furnace tube, and a second cooling sleeve sleeved to the microwave transmitter, a water inlet of the first cooling sleeve and a water inlet of the second cooling sleeve respectively communicate with a water outlet of the water cooler, and a water outlet of the first cooling sleeve and a water outlet of the second cooling sleeve respectively communicate with a water inlet of the water cooler; and the top and the bottom of the furnace tube are respectively connected to a furnace cover through a flange, the furnace cover is connected to the corresponding flange through a bolt, a nut of the bolt is away from the furnace tube, a compression spring is sleeved on the bolt, and the compression spring comprises one end abutted against the nut and the other end abutted against the furnace cover; and the gas inlet and the gas outlet are respectively communicate with the inside of the furnace tube through a ferrule tube fitting, the ferrule tube fitting passes through the corresponding furnace cover, and a pressure ring is disposed between the furnace cover and the ferrule tube fitting.

2. The opening-closing type microwave catalytic reaction apparatus according to claim 1, further comprising a control module, wherein the control module comprises a programmable logic controller (PLC) and a voltage stabilized power supply electrically connected to the PLC programmable controller, the microwave transmitting unit further comprises a microwave power supply and a microwave power meter that are respectively and electrically connected to the microwave transmitter, and the water cooler, the microwave power supply and the microwave power meter are respectively and electrically connected to the PLC programmable controller.

3. The opening-closing type microwave catalytic reaction apparatus according to claim 2, further comprising a detection module, wherein the detection module comprises an acousto-optic alarm, a temperature sensor, a pressure sensor, a microwave leakage detector disposed out of the microwave cavity and an overheat switch disposed on a magnetron of the microwave transmitter, the temperature sensor comprises two thermocouples that are respectively arranged on the top and the bottom of the furnace tube and a plurality of infrared thermometers arranged on the microwave cavity, the pressure sensor is disposed in the furnace tube, and the acousto-optic alarm, the temperature sensor, the pressure sensor, the microwave leakage detector and the overheat switch are respectively and electrically connected to the PLC programmable controller; the acousto-optic alarm and the voltage stabilized power supply are respectively and electrically connected to the microwave leakage detector; and the PLC programmable controller controls on and off of the magnetron through the overheat switch.

4. The opening-closing type microwave catalytic reaction apparatus according to claim 3, further comprising an interactive module, wherein the interactive module comprises a touch display screen electrically connected to the PLC programmable controller.

5. The opening-closing type microwave catalytic reaction apparatus according to claim 2, further comprising a network card electrically connected to the PLC programmable controller, wherein the PLC programmable controller is in signal connection with a computer through the network card, and a data interface for inputting and outputting data is further disposed on the PLC programmable controller.

6. The opening-closing type microwave catalytic reaction apparatus according to claim 1, wherein a crank arm comprises one end fixedly connected to a top of an upper cover, and the other end fixedly connected to a top of the cavity cover.

7. The opening-closing type microwave catalytic reaction apparatus according to claim 1, wherein a heat insulating material is filled between the furnace tube and the microwave cavity, the heat insulating material is a special-shaped material sintered from polycrystalline mullite and having a pentahedral structure, and a flexible graphite ring for sealing the microwave is clamped between the first cooling sleeve and the furnace tube.

* * * * *